United States Patent
Windrem

(10) Patent No.: US 6,437,831 B1
(45) Date of Patent: Aug. 20, 2002

(54) EFFECTS RECALL BETWEEN MIX/EFFECTS BANKS

(75) Inventor: Kevin D. Windrem, Grass Valley, CA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 0 days.

(21) Appl. No.: 09/364,372

(22) Filed: Jul. 30, 1999

(51) Int. Cl.⁷ .............................. G03B 13/00
(52) U.S. Cl. ................... 348/578; 348/705; 348/598
(58) Field of Search ................ 348/705, 706, 348/578, 584, 586, 587, 590, 591, 593, 594, 598; H04N 9/74, 5/268

(56) References Cited

U.S. PATENT DOCUMENTS

| | | | | |
|---|---|---|---|---|
| 4,205,344 A | * | 5/1980 | Rayner | 62/238.6 |
| 4,947,254 A | * | 8/1990 | Abt et al. | 348/585 |
| 5,016,105 A | * | 5/1991 | Muller et al. | 348/585 |
| 5,986,717 A | * | 11/1999 | Fairhurst | 348/579 |

* cited by examiner

Primary Examiner—Michael H. Lee
(74) Attorney, Agent, or Firm—Joseph S. Tripoli; Harvey D. Fried; Francis A. Davenport

(57) ABSTRACT

A method of recalling effects between mix/effects banks of a video production switcher uses a Recall From function button on a destination mix/effects bank to copy a desired effect stored in an effects memory on another M/E bank into a working effects register of the destination mix/effects bank when the Recall function for the other M/E bank is then used. The effect from the storing M/E bank is copied into a working effects register on the destination M/E for execution while the working effects register on the storing M/E bank is not affected so that the effect stored in the working effects register of the destination M/E is not destroyed.

1 Claim, 2 Drawing Sheets

EFFECTS RECALL BETWEEN MIX/EFFECTS BANKS

BACKGROUND OF THE INVENTION

The present invention relates to video signal processing, and more particularly to the recall of effects between mix/effects banks in a video production switcher.

The current state of the art in video production switchers provides a powerful effects memory system, such as that disclosed in U.S. Pat. No. 4,205,344. Live production complexity has increased significantly because of such effects memory systems to the point that it is simply not possible to operate in today's fast-paced live environment without some form of memory system. Each mix/effects (M/E) bank historically has its own effects memory system. Effects built for use on one M/E bank are not available for use on another. Normally a television program is organized so that the next effect is recalled on an off-air M/E bank. This allows the switcher operator, camera operators and others involved in the production the ability to see what is next and make any necessary changes. When changes to a program rundown occur, the next effect may be on the M/E bank that currently is on-air, preventing the normal preview/adjustment operation.

Operators who find themselves in this situation on a regular basis end up building important effects into the effects memory system of each M/E. However there is a limit to the number of registers available in the effects memory system which is based upon the need to access any memory register with a minimum number of button presses, such as one or two, not on the memory requirement for more registers.

What is desired is the ability to recall effects for one M/E bank from another M/E bank.

BRIEF SUMMARY OF THE INVENTION

Accordingly the present invention provides a recall of effects between mix/effects (M/E) banks in a video production switcher. A Recall From button is added to each effects memory panel for the video production switcher. When Recall From is activated for one M/E, it enables an effect recalled from another M/E effects memory to be copied to a working effects register of the one M/E for execution. The effect in the working effects register of the other M/E is not affected.

The objects, advantages and other novel features of the present invention are apparent from the following detailed description when read in conjunction with the appended claims and attached drawing.

DETAILED DESCRIPTION OF THE INVENTION

Figure 1:
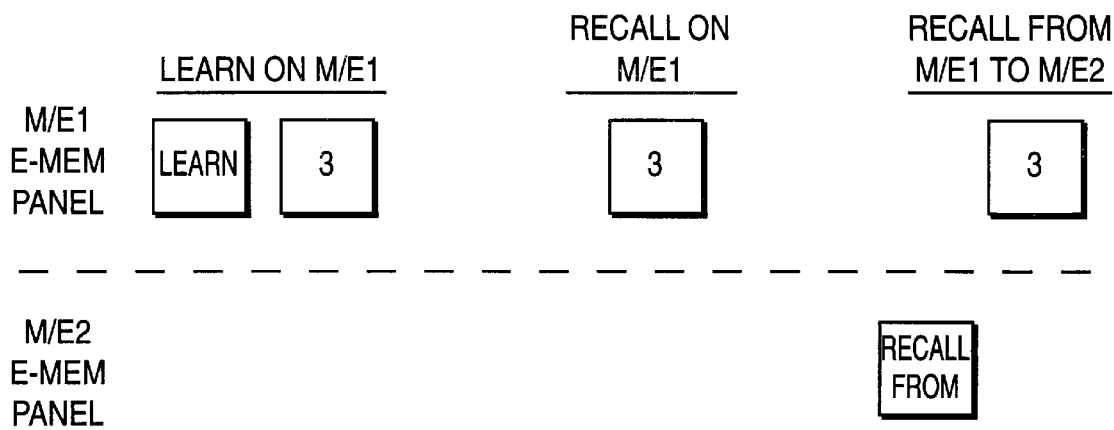
FIG. 1 is an illustrative view of Learn, Recall and Recall From operations for M/Es according to the present invention.

Effects for a production switcher M/E bank are built, stored and recalled in the normal manner, as described in U.S. Pat. No. 4,205,344. Operating modes and register learns and recalls are selected by an operator by pushing the appropriately labeled panel push-button(s). The production switcher status for the desired effect is stored during a register learn and restored during a register recall. To recall any effect the push-button of the register where the effect is stored is pushed, and the effect is a then automatically executed. This is shown in the first two stages of FIG. 1 where a table is shown with M/E number on one axis and operations along the other. As shown to learn an effect on M/E#1 a "Learn" button and an appropriate register button "3" are activated in sequence and the settings of the production switcher controls are stored in Register 3 on M/E#1. To recall the effect stored in Register 3 on M/E#1 the register number "3" is activated. However to recall the effect stored in Register 3 on M/E#1 for execution by M/E#2, the Recall From button is activated on M/E#2 and then the register number "3" is activated on M/E#1.

Figure 2:
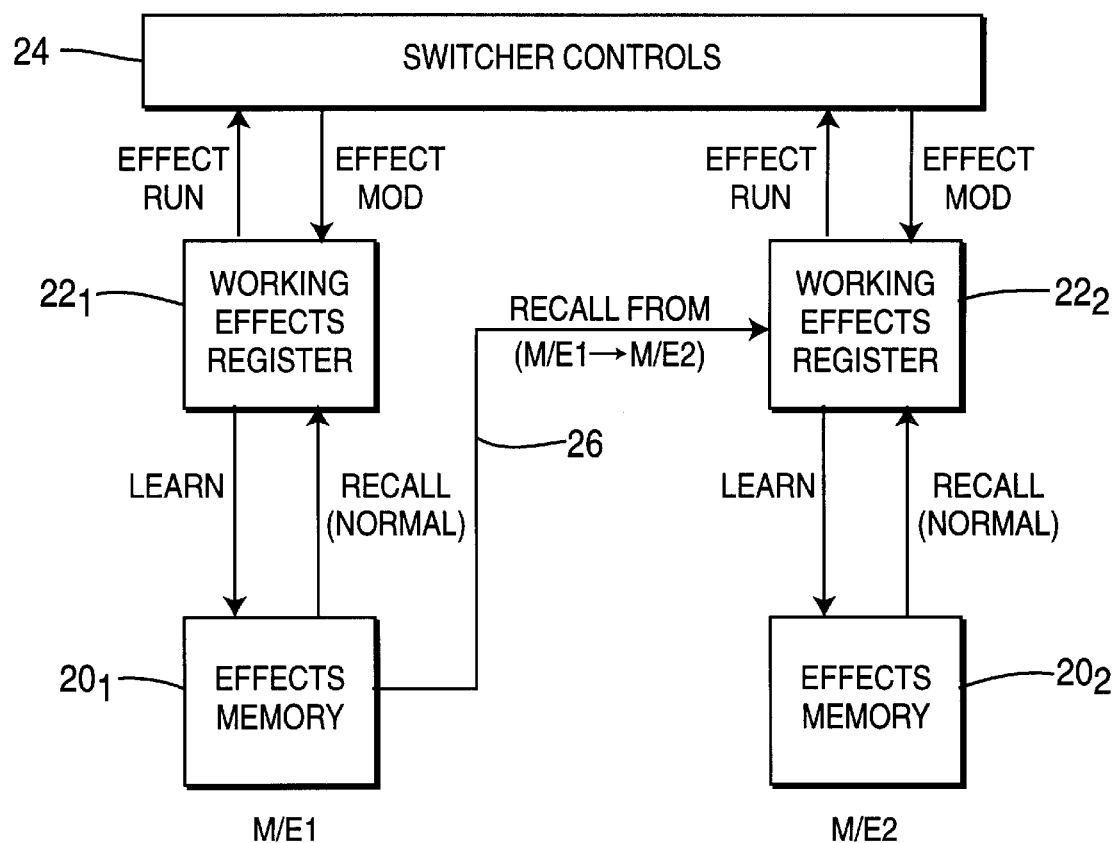
FIG. 2 is a flow chart view illustrating the data flow paths for Recall From operations between M/Es according to the present invention.
Figure 3:
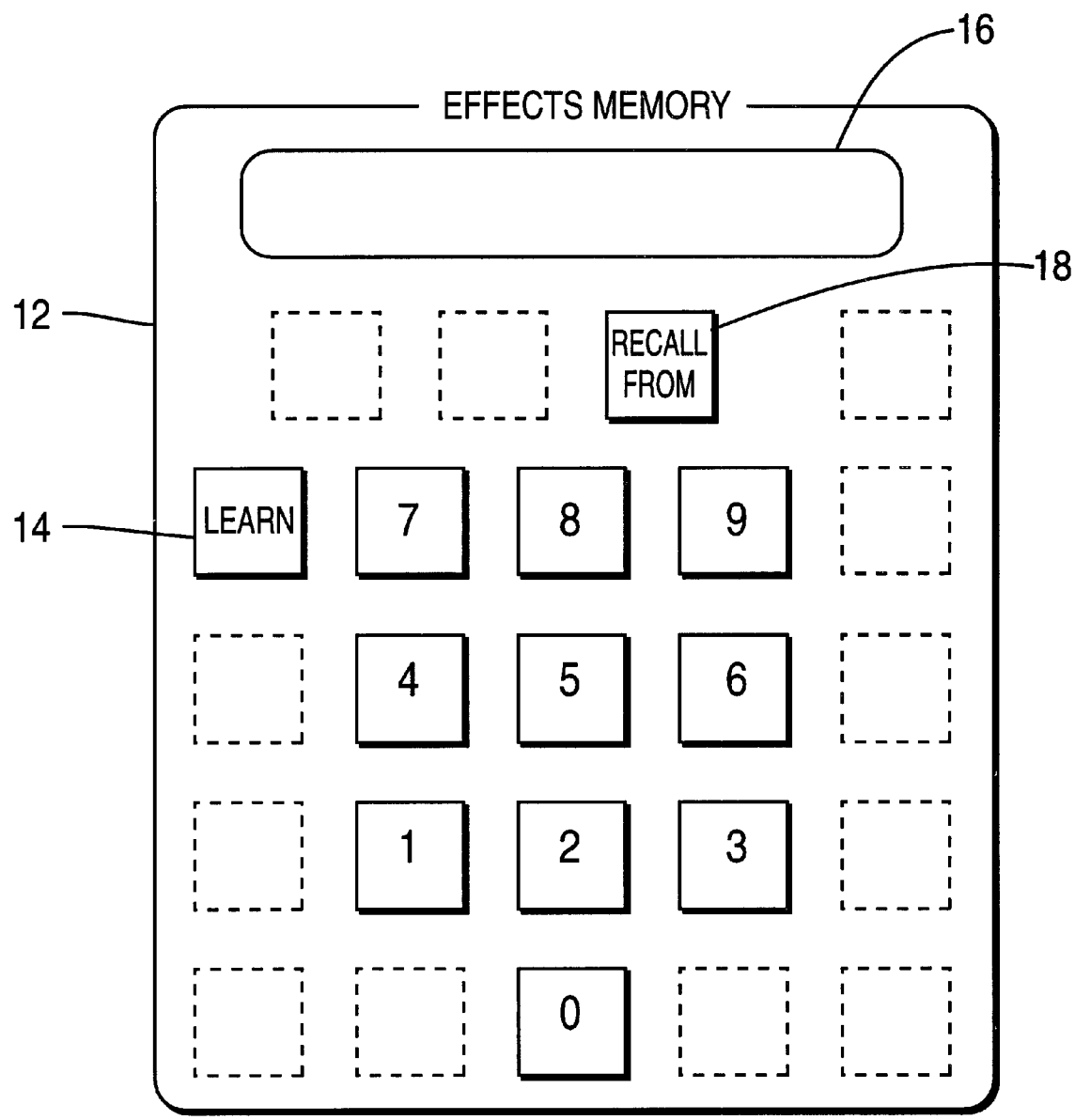
FIG. 3 is a plan view of an effects memory panel according to the present invention.

Referring now to FIGS. 2 and 3 an effects memory panel 12 for a given M/E has a Learn button 14, a set of numeric buttons 0–9, an alpha-numeric display 16 for indicating the status of a working effects register for the M/E, and a Recall From button 18. Each M/E bank has an effects memory 20 with a plurality of registers, each register capable of storing one effect. The effects memory 20 is coupled to the working effects register 22, with effects "Learn" being transferred from the working effects register to the effects memory and effects "Recall" being transferred normally from the effects memory to the working effects register of the same M/E. The working effects register 22 is coupled to the switcher controls 24 to either run the effect by converting the contents of the working effects register to switcher control settings for the recalled effect or to modify/create effects by storing switcher control settings in the working effects register for subsequent storage in the effects memory 20.

An additional Recall From path 26 is provided from the effects memory 201 of one M/E to the working effects register 222 of another M/E. When Recall From is activated by one M/E, the other M/Es are alerted and the next effect recalled from the effects memory of one of the other M/Es is routed to the working effects register of the calling M/E for execution. The working effects register of the M/E from which the effect was recalled is not affected by the Recall From operation since the effect is routed to the working effects register of the calling M/E rather than to the working effects register of the storing M/E.

Thus the present invention provides for the recall of effects between M/E banks on a production switcher by use of a Recall From button on a destination M/E bank and a normal recall sequence on the storing M/E bank whereby the effect from the storing M/E bank is copied into a working effects register on the destination M/E bank for execution without affecting the working effects register of the storing M/E bank.

What is claimed is:

1. A method of recalling effects between mix/effects banks of a video production switcher comprising the steps of:

asserting a Recall From function on a destination mix/effects bank; and recalling a desired effect from a storing mix/effects bank so that the desired effect is copied into a working effects register in the destination mix/effects bank for execution without affecting a working effects register in the storing mix/effects bank.

* * * * *